Sept. 11, 1923.  1,467,846
C. H. DUGAS
TRAP
Filed Jan. 5, 1922  2 Sheets-Sheet 1
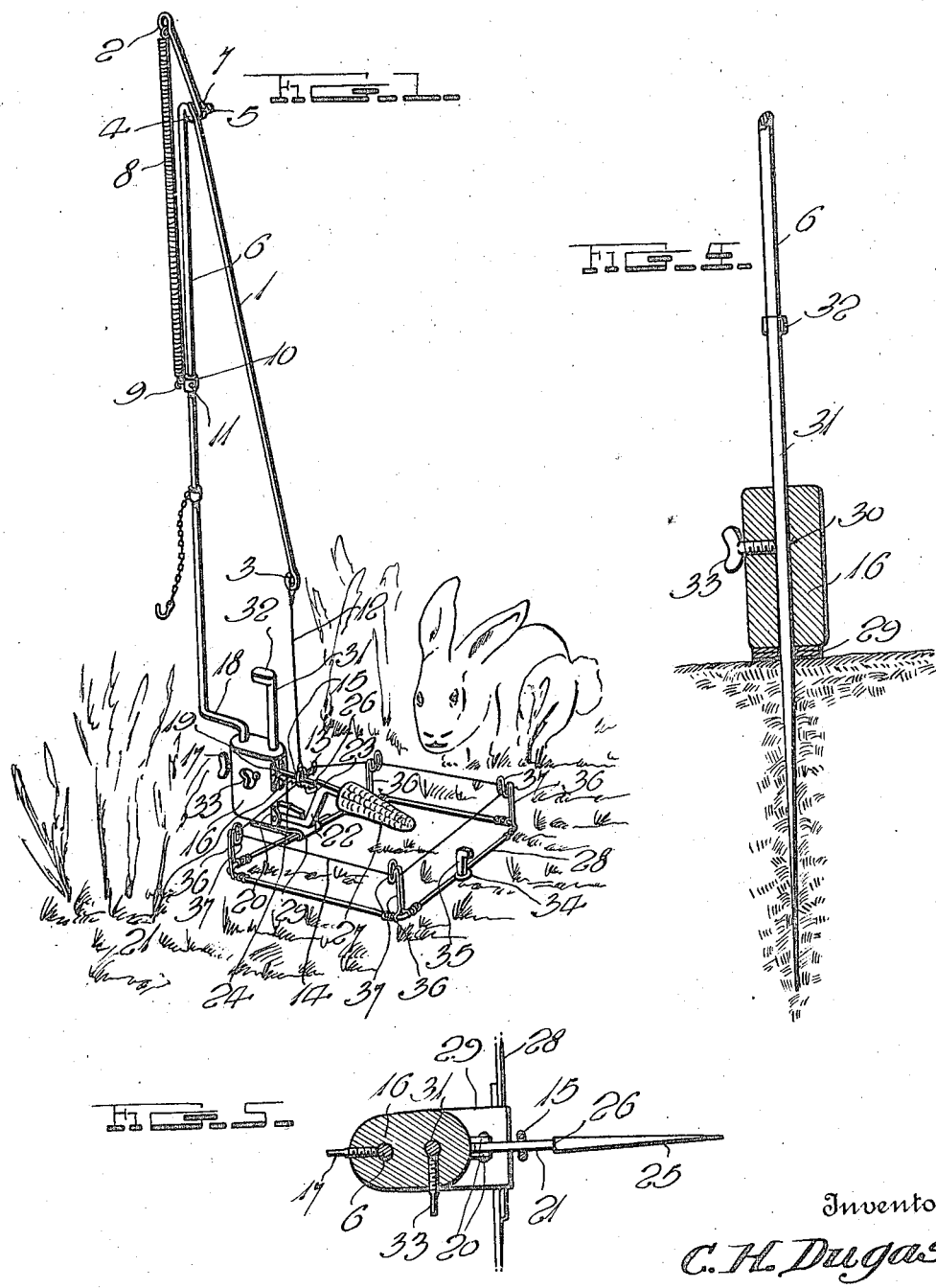

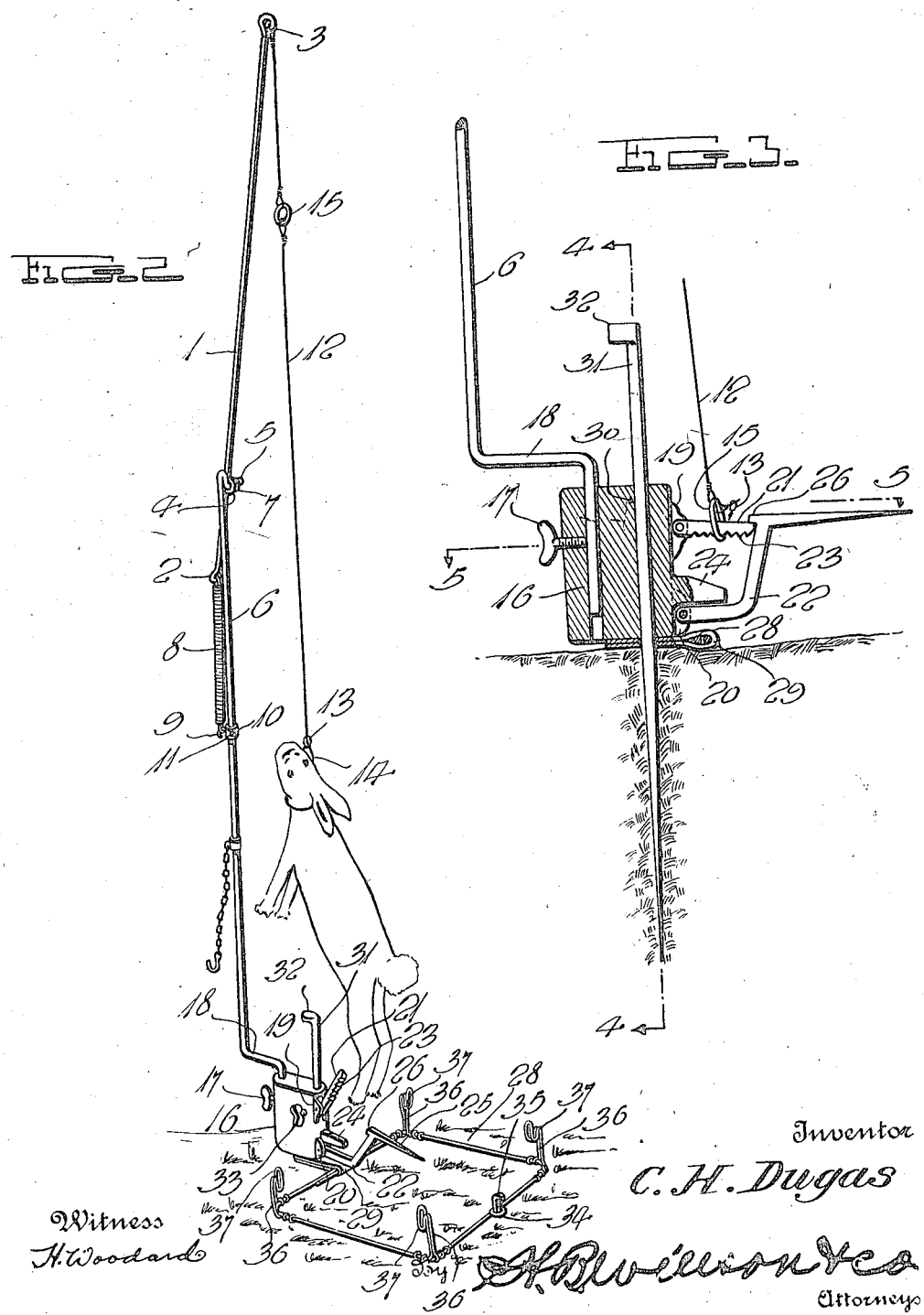

Patented Sept. 11, 1923.

1,467,846

UNITED STATES PATENT OFFICE.

CHARLES H. DUGAS, OF MARSHALL, MINNESOTA.

TRAP.

Application filed January 5, 1922. Serial No. 527,127.

*To all whom it may concern:*

Be it known that I, CHARLES H. DUGAS, a citizen of the United States, residing at Marshall, in the county of Lyon and State of Minnesota, have invented certain new and useful Improvements in Traps; and I do declare the following to be a full, clear, and exact description of the invention, such as will enable others skilled in the art to which it appertains to make and use the same.

This invention relates to an improved trap of the ensnaring type and one object of the invention is to provide a trap having an improved type of standard for carrying a swinging arm with which the choker line will be connected and to provide an improved base for this standard, this base serving not only as a carrier for the standard but also serving as means for carrying a latch and trigger by means of which the swinging spring actuated arm may be releasably held in a lowered position with the noose of the choker line engaged by a noose holder.

Another object of the invention is to so construct the noose holder that it may be formed of wire and include a frame portion formed of relatively heavy wire or light rod metal and line-engaging fingers each of which is formed from a strand of wire doubled intermediate its length to form the body of the finger and then bent to provide side arms twisted about the wire forming the frame.

Another object of the invention is to so construct the base and frame portion of the noose holder that a plate or tongue carried by the frame of the noose holder may extend beneath the base which carries the standard and a securing pin passed through the base and tongue extension of the frame and driven into the ground to secure the trap in place and hold the parts in the proper relative position.

Another object of the invention is to provide a trap which may be formed of parts readily assembled or taken apart and thus permitting the trap to be easily carried from one place to another and easily set up at the point where it is to be used.

Another object of the invention is to provide a trap which will be formed of a comparatively few number of parts, all of which will be strong and durable and not liable to easily break or get out of order.

This invention is illustrated in the accompanying drawings, wherein:

Figure 1 is a perspective view showing the trap set and a rabbit approaching the trap.

Figure 2 is a perspective view showing the rabbit caught and suspended in the air by the choker line.

Figure 3 is a fragmentary sectional view of the trap.

Figure 4 is a sectional view taken along the line 4—4 of Fig. 3.

Figure 5 is a sectional view taken along the line 5—5 of Fig. 3.

This trap or snarer as it may be called is of the strangling type and is provided with an arm 1 which is formed of relatively heavy rod metal provided with eyes 2 and 3 at its ends and bent intermediate its length to form a bearing eye 4 through which will extend a pivot pin 5 formed by bending the upper end portion of a standard 6 which is also formed of relatively heavy rod metal. This pivot pin 5 is threaded and carries a securing nut 7 to hold the arm upon the pivot pin. A spring 8 has its upper end secured in the eye 2 of the arm 1 and has its lower end connected with the hook 9 of a collar 10 which is slidably mounted upon the standard and will be secured in an adjusted position upon this standard by means of a set screw 11. It will thus be seen that the collar may be anchored at any desired point upon the standard so that when the arm is swung downwardly to the position shown in Fig. 1 the spring will be stretched the desired amount and will serve to normally retain the arm in the raised position shown in Fig. 2. A choker line 12 is secured in the eye 3 of the arm 1 and has its free end portion provided with a ring 13 so that a running noose 14 may be formed. This noose 14 will be held open as shown in Fig. 1 when the trap is set and will catch about the neck of the animal and thus cause the animal to be swung clear of the ground and choke to death when the arm is permitted to swing upwardly to the position shown in Fig. 2. Intermediate the length of the line 12, there has been provided a ring 15 by means of which the arm 1 may be held in the position shown in Fig. 1 with the noose held in the open position shown.

The lower end portion of the standard will be connected with the carrier or base 16 which is in the form of an iron block having a socket formed therein so that the lower end of the standard may be inserted and the set screw 17 then tightened to securely hold the standard in connection with the base or carrier. It should be noted that the lower end portion of this standard is bent as shown at 18 so that the main portion of the standard will be off-set to one side of the base. This base or carrier 16 is provided with upper and lower sets of bearing ears 19 and 20 so that the latch 21 and trigger 22 may be pivotally connected with the base. This latch 21 which is to pass through the ring 15 as shown in Fig. 3 is in the form of a short rod or finger which is provided upon its under face with teeth 23 so that when the ring is in engagement with this finger, it cannot slide longitudinally upon the finger toward the block. It will thus be seen that the ring will be held in the desired position and when the latch is released, the latch may be easily swung upwardly and the ring permitted to pass freely off of the free end of the latch. The trigger 22 which will be limited in its upward swinging movement by means of the abutment finger 24 has its free end portion extending upwardly and terminating in an outwardly extending bait holding prong 25 and an inwardly extending heel or lug 26, the heel or lug 26 being adapted to engage the free end portion of the latch as shown clearly in Fig. 3 and thus prevent the latch from swinging upwardly to release the ring 15 until the trigger has been moved downwardly. The bait 27 which is in the form of an ear of corn in the disclosure of Fig. 1 will be placed upon this bait-carrying prong 25 and when so held will be in a plane beneath the plane of the noose 14 which will be held as shown in Fig. 1. Therefore, the rabbit or other animal must extend its head over the noose in order to reach the bait and the noose can therefore easily close about the neck of the animal when the trap is released and the arm 1 permitted to swing upwardly to draw the animal out of engagement with the ground and suspend it as shown in Fig. 2.

In order to hold the noose in the open position shown in Fig. 1, there has been provided a noose holder having a frame which is to rest upon the ground. This frame 28 is formed of relatively heavy wire or light rod metal and in the form shown is bent to provide a square. The ends of the wire extend in overlapping relation and pass through a leaf 29 which is formed of sheet metal folded as shown in Fig. 3. This leaf is to extend beneath the base or carrier 16 and will be provided with an opening for registering with the passage 30 formed in the base in front of the passage which receives the lower end of the standard 6. A stake 31 is passed through the passage 30 and through the registering opening of the leaf and will be driven firmly into the ground, a head 32 being formed upon this stake so that it may be easily driven into the ground. After the stake has been driven firmly into the ground, the set-screw 33 will be tightened and the bait will be held firmly upon the stake and will serve to hold the leaf against movement. It will thus be seen that the frame 28 will be held in the desired position. In order to assist in holding this frame upon the ground, it may be provided with one or more eyes 34 through each of which a small stake or pin 35 will be passed and driven into the ground. It will thus be seen that this frame will be firmly held in place and cannot be accidentally knocked out of the desired position. It will be also noted that since the base or carrier 16 is fastened to the stake 31, it will be held in the proper position and the standard and arm will be held in the proper position with relation to the frame. Fingers 36 extend upwardly from this frame 28 and have their upper free end portions provided with hook elements 37 which are to engage the noose forming portion of the line 12 and hold the noose open. It should be noted however that these hook elements are in such form that the line may be easily drawn off of them when the latch is released and the arm 1 permitted to swing upwardly. Each of these fingers 36 is formed from a strand of wire which is doubled intermediate its length and then bent to provide the hook 37 at its upper end and side arms at its lower end. These side arms are twisted about the frame 28 so that the fingers will be securely connected with the frame and positioned in an upright position. It should be noted that the fingers will be located at the corners of the frame so that the fingers will be more securely held in place and cannot slip longitudinally upon the rod or heavy wire from which the frame is made.

When this trap is in use, it will be set up as shown in Fig. 1 and the ring 15 will be placed upon the latch finger 21. The bait will be placed upon the prong 25 and the trigger will then be swung into operative engagement with the latch. The noose will then be placed in engagement with the fingers 36 and the trap is set. When the rabbit or other animal attempts to eat the bait, the trigger will be moved downwardly thus releasing the latch and permitting the spring to swing the arm upwardly so that the noose is tightened about the neck of the animal and the animal suspended as shown in Fig. 2. When it is desired to remove the trap, it can be easily taken apart and stored in a small receptacle.

I claim:

1. A trap comprising a base noose holding means including an element extending beneath the base and fastener means extending through said base and the element and beneath the same for securing the noose holder and base, ensnaring means carried by the base and including a choker having its free end portion in the form of a running noose, and means for drawing upon said line to tighten the noose about an animal, a latch engaging means carried by said line, and a trigger for engaging the latch and releasably holding the latch in a set position with the noose held open by the noose holding means and the latch engaging means of the line engaged with the latch.

2. The structure of claim 1 having the noose holding means in the form of an open frame of rod metal, and line engaging fingers carried by and extending upwardly from the frame and each formed of a strand of wire doubled to form a shank portion having a hook portion at its upper end and arms extending from its lower end and twisted about the rod metal frame.

3. The structure of claim 1 having the noose holding means in the form of an open frame of rod metal, and line engaging fingers carried by and extending upwardly from the frame, a leaf extending from one side of the frame beneath the base, a securing stake extending through the base and leaf for anchoring the trap upon the ground, and fastener means anchoring the base upon the stake.

4. The structure of claim 1 having the latch in the form of a finger pivotally connected with the base for passing through a ring carried by the line, the trigger being in the form of an arm pivotally connected with the base beneath the latch and having its free end portion extending upwardly and terminating in an outwardly extending bait holding prong and an inwardly extending lug for engaging the free end of the latch finger and releasably holding the latch in a set position with the ring upon the latch and the arm swung downwardly with the noose engaged by the noose holding means, and means carried by the base for limiting upward swinging movement of the trigger.

5. A trap comprising noose holding means, a standard, a base having said standard, removably and adjustably connected therewith, common fastener means for the base and noose holding means adapted to be passed through the same into the ground, an arm pivotally connected with said standard, resilient means connected with the standard and with the rear end of the same and yieldably holding the arm swung upwardly, a line carried by the forward end of said arm and having its free end portion in the form of a choking noose held open when in engagement with said noose holding means, a latch carried by said base, means intermediate the length of said line for engaging said latch with the arm swung downwardly and the noose in engagement with the noose holding means, and a trigger and bait holder carried by the base for engaging the latch in an operative position, the bait holding portion extending in operative relation to the noose holder.

6. A trap comprising a frame for resting upon the ground, line engaging fingers extending upwardly from the frame, stakes for holding the frame upon the ground, a block upon one of said stakes, a standard carried by and extending upwardly from said block, an arm pivotally connected with said standard, a spring connected with one end of said arm, an anchor connected with the other end of said spring and adjustably mounted upon said standard, a latch finger pivotally connected with said block, a line carried by the free end of said arm and having its free end portion in the form of a running noose held in an open position by engagement with the line engaging fingers, a ring carried by the line intermediate its length for engaging said latch finger to hold the arm swung downwardly against the action of said spring with the noose engaged by said line engaging fingers, and a trigger and bait holder pivotally connected with said block beneath said latch finger and movable into and out of position for engaging said latch finger and having its bait holding portion extending above said frame and below the plane of the upper ends of the line engaging fingers.

In testimony whereof I have hereunto set my hand.

CHARLES H. DUGAS.